United States Patent
Dehais (10) Patent No.: US 11,187,354 B2
(45) Date of Patent: Nov. 30, 2021

(54) METHOD FOR ATTACHING AN ANCHORAGE ELEMENT TO AN ELEMENT OF THE ARMOR OF A FLEXIBLE PIPE, ASSOCIATED PIPE AND ASSOCIATED FITTING METHOD

(71) Applicant: TECHNIP FRANCE, Courbevoie (FR)

(72) Inventor: Romuald Dehais, Saint-Arnoult (FR)

(73) Assignee: TECHNIP FRANCE

( * ) Notice: Subject to any disclaimer, the term of this patent is extended or adjusted under 35 U.S.C. 154(b) by 0 days.

(21) Appl. No.: 16/603,293

(22) PCT Filed: Apr. 11, 2018

(86) PCT No.: PCT/EP2018/059328
§ 371 (c)(1),
(2) Date: Oct. 7, 2019

(87) PCT Pub. No.: WO2018/189261
PCT Pub. Date: Oct. 18, 2018

(65) Prior Publication Data
US 2021/0108743 A1 Apr. 15, 2021

(30) Foreign Application Priority Data
Apr. 12, 2017 (FR) .................... 17 53199

(51) Int. Cl.
*F16L 11/08* (2006.01)
*B23K 31/02* (2006.01)
(Continued)

(52) U.S. Cl.
CPC .......... *F16L 11/083* (2013.01); *B23K 31/027* (2013.01); *F16L 33/01* (2013.01); *B23K 2101/06* (2018.08)

(58) Field of Classification Search
CPC ...... F16L 11/083; F16L 33/01; B23K 31/027; B23K 2101/06
(Continued)

(56) References Cited

U.S. PATENT DOCUMENTS 3,934,617 A * 1/1976 Henderson ................ F16L 9/18
138/114
4,033,612 A * 7/1977 Chevalier ............. F16L 11/083
285/222.4
(Continued)

FOREIGN PATENT DOCUMENTS

CN 103480955 A 1/2014
CN 105473248 A 4/2016
(Continued)

OTHER PUBLICATIONS

International Search Report dated Jun. 15, 2018 in corresponding PCT International Application No. PCT/EP2018/059328.
(Continued)

*Primary Examiner* — Craig M Schneider
*Assistant Examiner* — David R Deal
(74) *Attorney, Agent, or Firm* — Ostrolenk Faber LLP (57) ABSTRACT

A method for attaching at least one transverse anchorage element to an armor element intended to be housed in an end-fitting of a flexible pipe, including the following steps: the supply of an attachment device accepting an anchorage element; the bringing of an opening to face the armor element; the melting of one end of the anchorage element facing the armor element and of a region of the armor element facing the anchorage element, inside the cavity of the attachment device; the forging of the anchorage element transversely on the armor element, using the attachment device; and the formation of a weld connecting the anchorage element and the armor element.

17 Claims, 5 Drawing Sheets

(51) Int. Cl.
*F16L 33/01* (2006.01)
*B23K 101/06* (2006.01)

(58) Field of Classification Search
USPC ........................................ 138/129, 134, 127
See application file for complete search history.

(56) References Cited

U.S. PATENT DOCUMENTS

| | | | | |
|---|---|---|---|---|
| 5,362,113 A | * | 11/1994 | Thomas | F16L 13/02 |
| | | | | 138/135 |
| 6,412,825 B1 | * | 7/2002 | Langkjaer | F16L 33/01 |
| | | | | 285/222.1 |
| 6,742,813 B1 | * | 6/2004 | Glejbol | F16L 33/01 |
| | | | | 285/222.1 |
| 8,408,311 B2 | * | 4/2013 | Grayson | F16L 39/00 |
| | | | | 166/367 |
| 9,923,355 B2 | * | 3/2018 | Larsson | F16G 11/042 |
| 10,099,319 B2 | * | 10/2018 | Kocks | B23K 9/0286 |
| 10,683,951 B2 | | 6/2020 | Roberts | |
| 10,690,275 B2 | * | 6/2020 | Phillips | F16L 33/01 |
| 2006/0082140 A1 | * | 4/2006 | Rytter | F16L 33/01 |
| | | | | 285/222.1 |
| 2010/0025985 A1 | | 2/2010 | De Aquino | |
| 2015/0375332 A1 | | 12/2015 | Dillon | |
| 2016/0319972 A1 | * | 11/2016 | Dehais | F16L 33/01 |
| 2016/0334039 A1 | * | 11/2016 | Bourget | F16L 33/01 |

FOREIGN PATENT DOCUMENTS

| | | |
|---|---|---|
| CN | 106413970 A | 2/2017 |
| EP | 1 206 659 B1 | 8/2005 |
| EP | 1 579 141 B1 | 8/2011 |
| FR | 3 008 161 A1 | 1/2015 |
| FR | 3 016 020 A1 | 7/2015 |
| WO | WO 99/19655 A1 | 4/1999 |
| WO | WO 2008/037867 A1 | 4/2008 |
| WO | WO 2016/170360 A1 | 10/2016 |

OTHER PUBLICATIONS

Written Opinion dated Jun. 15, 2018 in corresponding PCT International Application No. PCT/EP2018/059328.
Preliminary Search Report dated Dec. 1, 2017 in corresponding French Patent Application No. 17 53199.
Yang Wenji "Electric Arc Welding Method and Device", http://img.duxiu.com/n/jpgfs/book/base/11924841/226c7cbe3afd476 . . . with English translation (2020)—19 pages.
Chinese Notification, dated Aug. 10, 2021, issued in corresponding Chinese Patent Application No. 201880033946.4. Total 8 pages.

* cited by examiner

METHOD FOR ATTACHING AN ANCHORAGE ELEMENT TO AN ELEMENT OF THE ARMOR OF A FLEXIBLE PIPE, ASSOCIATED PIPE AND ASSOCIATED FITTING METHOD

CROSS-REFERENCE TO RELATED APPLICATIONS

The present application is a 35 U.S.C. §§ 371 national phase conversion of PCT/EP2018/059328, filed Apr. 11, 2018, which claims priority to French Patent Application No. 17 53199, filed Apr. 12, 2017, the contents of which are incorporated herein by reference. The PCT International Application was published in the French language.

TECHNICAL FIELD

The present invention relates to a method for attaching at least one transverse anchorage element on an armor element intended to be received in an end-fitting of a flexible pipe. The invention also relates to a flexible pipe and a fitting method of an end-fitting of this flexible pipe.

BACKGROUND OF THE INVENTION

The pipe is in particular a flexible pipe of the unbonded type designed to transfer hydrocarbons through a body of water, such as an ocean, sea, lake or river, or to inject water for well stimulation.

Such a flexible pipe is for example made according to normative documents API 17J (Specification for Unbonded Flexible Pipe) and API RP 17B (Recommended Practice for Flexible Pipe) and API 16C (Choke and Kill Equipment) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent. In particular, an unbonded pipe is a pipe with no bonding materials connecting the layers forming the pipe.

The pipe is generally positioned through a body of water, between a bottom assembly, designed to collect the fluid mined in the bottom of the body of water, and a floating surface assembly designed to connect and distribute the fluid. The surface assembly may be a semisubmersible platform, an FPSO or another floating assembly.

In some cases, for the exploitation of fluids in deep water, the flexible pipe has a length exceeding 800 m. The ends of the pipe have fittings for connecting to the bottom assembly and the surface assembly.

These pipes undergo very high axial tensile forces, in particular when the body of water in which the pipe is positioned is very deep. These forces are reacted by one or several layers of tensile armors made up of filiform armor elements made from steel wound with a long pitch around inner layers of the pipe, and the ends of which are fastened in the end-fittings.

In that case, the upper fitting connecting the pipe to the surface assembly must react a very significant axial tension, which may reach several hundreds of tons.

The axial tension not only has a high average value, but also constant variations depending on the vertical movements of the surface assembly and the pipe, under the effect of the agitation of the body of water caused by the swell or by the waves.

The axial tension variations may reach several tens of tons and repeat continually throughout the lifetime of the pipe. In 20 years, the pipe may be required to undergo a large number of tension cycles. For example, more than 20 million cycles may occur.

It is therefore necessary to ensure particularly robust fastening between the tensile armor layers and the body of the end-fitting. To that end, it is known to insert the ends of the armor elements into a receiving space defined by the end-fitting, then to fill the receiving space with a material such as a thermosetting resin, to capture the ends of the armor elements.

To improve the holding of the armor elements, WO 2008/037867 describes a method for welding anchorage elements on the armor elements, at the ends. The anchorage elements are metal elements protruding transversely on the armor element to widen it, which blocks the armor element in translation and prevents it from sliding inside the fitting.

This method may be further improved. Indeed, the anchorage elements are attached to the armor elements by longitudinal welding along faces in contact, for example by electric arc welding. This attachment method requires the intervention of qualified personnel, for the welding. Furthermore, it requires a significant length of time, since at least one anchorage element must be attached on each end of each armor element, by two longitudinal welds each time.

SUMMARY OF THE INVENTION

One aim of the invention is to ensure a robust attachment of the armor elements in a flexible pipe fitting, simply and very quickly.

To that end, the invention relates to an attachment method of the aforementioned type, characterized in that the method includes the following steps:
  the supply of an attachment device having a cavity accepting an anchorage element;
  the bringing of an opening of the cavity to face the armor element;
  the melting of one end of the anchorage element facing the armor element and of a region of the armor element facing the anchorage element, inside the cavity of the attachment device;
  the forging of the anchorage element transversely on the armor element, using the attachment device; and
  the formation of a weld connecting the anchorage element and the armor element.

The method according to the invention may comprise one or more of the following features, considered alone or according to any technically possible combination:
  the method comprises a step for heat treatment of the anchorage element and the armor element after the forging step, the weld connecting the anchorage element and the armor element forming during the heat treatment step;
  the weld has a transverse expanse smaller than a width of the armor element;
  the melting step comprises forming an electric melting arc between the anchorage element and the armor element;
  the method comprises a step for diffusing a neutral gas around at least one of the end of the anchorage element or the region of the armor element, the diffusion step taking place during the melting and forging steps;
  the melting step comprises forming a priming arc before the formation of the electric melting arc, the priming arc having a lower intensity than an intensity of the electric melting arc;

a refractory ring is positioned around the end of the anchorage element facing the armor element during the placement step;

a ratio between a length of the anchorage element, measured along a direction transverse to the armor element, and a width of the anchorage element, measured along a direction parallel to the armor element, is greater than 2, advantageously greater than 4;

the length of the anchorage element is greater than a thickness of the armor element, measured along the same direction as the length of the anchorage element, advantageously two times greater than the thickness of the armor element;

the anchorage element is substantially cylindrical and has an axis substantially perpendicular to a local axis of the armor element;

the method comprises a series of attachments for transverse anchorage elements, each attachment comprising the supply, bringing, melting and forging steps, a duration separating each attachment being less than or equal to 1 minute, advantageously less than 30 seconds;

the anchorage elements are attached separated from one another by a distance along the armor element of between 2 cm and 20 cm, preferably between 2 cm and 10 cm, and advantageously between 2 cm and 5 cm; and the anchorage element has a base of a steel having a mechanical tensile strength greater than or equal to 400 MPa.

The invention also relates to a method for mounting an end-fitting for a flexible pipe comprising the following steps:

supplying a flexible pipe comprising:
at least one tubular sheath delimiting a circulation passage; and
at least one tensile armor element positioned outwardly relative to the tubular sheath, the armor layer comprising a plurality of filiform armor elements;

clearing an end segment of each armor element;
placing an end arch at one end of the pipe;
attaching at least one anchorage element on each armor element using a method according to the invention;
placing and attaching a cover on the end arch, forming a space for receiving end segments of the armor elements;
inserting a filler material into the space, embedding the anchorage elements; and
solidifying the filler material around the end segments and anchorage elements.

The invention further relates to a flexible pipe comprising:
at least one tubular sheath delimiting a circulation passage;
at least one tensile armor element positioned outwardly relative to the tubular sheath, the armor layer comprising a plurality of filiform armor elements; and
at least one end-fitting located at one end of the pipe, the end-fitting including an end arch and a cover, defining a space between them for receiving end segments of the armor elements, the space being filled with a filler material, characterized in that each end segment has at least one anchorage element protruding transversely, the anchorage element being embedded in the filler material, the anchorage element having been attached to the end segment by a method according to the invention.

BRIEF DESCRIPTION OF THE DRAWINGS

The invention will be better understood upon reading the following description, provided solely as an example, and in reference to the appended drawings, in which.

DESCRIPTION OF PREFERRED EMBODIMENTS

In the rest of this document, the terms "outer" and "inner" are generally to be understood radially relative to an axis A-A' of the pipe, the term "outer" being understood as being relatively radially further from the axis A-A' and the term "inner" being understood as being relatively radially closer to the axis A-A' of the pipe.

The terms "front" and "rear" are to be understood axially relative to an axis A-A' of the pipe, the term "front" being understood as being relatively further from the middle of the pipe and closer to one of its ends, the term "rear" being understood as being relatively closer to the middle of the pipe and further from one of its ends. The middle of the pipe is the point of the pipe situated at equal distances from the two ends thereof.

Figure 1:
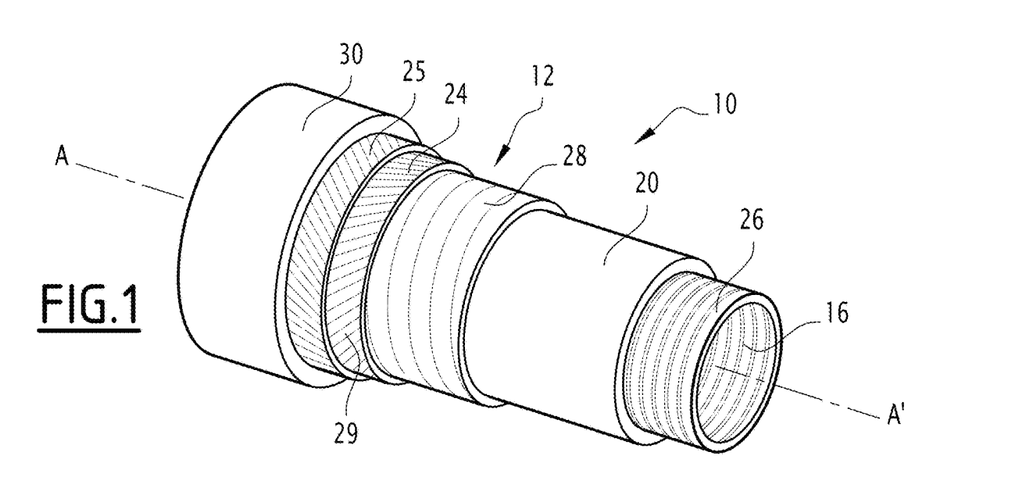
FIG. 1 is a partial cutaway perspective view of a segment of a flexible pipe.

A first flexible pipe 10 according to the invention is partially illustrated in FIG. 1.

The flexible pipe 10 includes a central segment 12 illustrated partially in FIG. 1. It includes, at each of the axial ends of the central segment 12, an end-fitting 14 made using a method according to the invention, partially shown in FIG. 2.

In reference to FIG. 1, the pipe 10 defines a central passage 16 for the flow of a fluid, advantageously an oil fluid. The central passage 16 extends along an axis A-A', between the upstream end and the downstream end of the pipe 10. It emerges through the end-fittings 14.

The flexible pipe 10 is designed to be positioned through a body of water (not shown) in a fluid exploitation facility, in particular for hydrocarbons.

The body of water is for example a sea, lake or ocean. The depth of the body of water at the fluid exploitation installation is for example between 500 m and 3000 m.

The fluid exploitation installation includes a surface assembly, in particular floating, and a bottom assembly (not shown), which are generally connected to one another by the flexible pipe 10.

The flexible pipe 10 is preferably an "unbonded" pipe. At least two adjacent layers of the flexible pipe 10 are free to move longitudinally relative to one another when the pipe bends. Advantageously, all of the layers of the flexible pipe are free to move relative to one another. Such a pipe is for example described in normative documents published by the American Petroleum Institute (API), API 17J "Specification for Unbonded Flexible Pipe" (4$^{th}$ edition, May 2014), API RP17B "Recommended Practice for Unbonded Flexible Pipe" (5$^{th}$ edition, May 2014) and API 16C "Choke and Kill Equipment" (2$^{nd}$ edition, March 2015).

As illustrated by FIG. 1, the pipe 10 delimits a plurality of concentric layers around the axis A-A', which extend continuously along the central segment 12 up to the end-fittings 14 situated at the ends of the pipe.

According to the invention, the pipe 10 includes at least one first tubular sheath 20 with a base of a polymer material advantageously forming a pressure sheath.

The pipe 10 further includes at least one tensile armor layer 24, 25 positioned outwardly relative to the first sheath 20.

Advantageously, and depending on the desired use, the pipe 10 further includes an inner carcass 26 positioned inside the pressure sheath 20, a pressure arch 28 inserted between the pressure sheath 20 and the tensile armor layer(s) 24, 25, and an outer sheath 30, designed to protect the pipe 10.

In a known manner, the pressure sheath 20 is designed to tightly confine the fluid transported in the passage 16. It is made from a polymer material, for example with a base of a polyolefin such as polyethylene or polypropylene, a base of a polyamide such as PA11 or PA12, or a base of a fluorinated polymer such as polyvinylidene fluoride (PVDF) or perfluoroalkoxy (PFA).

The thickness of the pressure sheath 20 is for example between 5 mm and 20 mm. When the carcass 26 is present, it is formed by a profiled metal sheet, wound in a spiral. The turns of the sheet are advantageously stapled to one another, which makes it possible to react the radial crushing forces.

In this example, the carcass 26 is positioned inside the pressure sheath 20. The pipe is then designated by the term "rough bore" due to the geometry of the carcass 26.

In an alternative that is not shown, the flexible pipe 10 has no inner carcass 26, and is then referred to as "smooth bore".

The helical winding of the profiled metal sheet forming the carcass 26 has a short pitch, i.e., it has a spiral angle with an absolute value close to 90°, typically between 75° and 90°.

In this example, the pressure arch 28 is designed to react the forces related to the pressure prevailing inside the pressure sheath 20. It is for example formed by a profiled metal wire wound in a spiral around the sheath 20. The profiled wire generally has a complex geometry, in particular in the shape of a Z, like in the example of FIG. 2, or in the shape of a T, U, K, X or I.

The pressure arch 28 is wound in a spiral with a short pitch around the pressure sheath 20, i.e., with a spiral angle with an absolute value close to 90°, typically comprised between 75° and 90°.

The flexible pipe 10 according to the invention comprises at least one armor layer 24, 25 formed by a helical winding of at least one elongated armor element 29.

Typically, the flexible pipe comprises at least two armor layers, but it can comprise more than two armor layers, for example four armor layers.

In the example shown in FIG. 1, the flexible pipe 10 includes a plurality of inner armor layers 24, 25, in particular an inner armor layer 24, pressed on the pressure arch 28, and an outer armor layer 25 around which the outer sheath 30 is positioned.

Each armor layer 24, 25 includes longitudinal armor elements 29 wound in a helix with a long pitch around the axis A-A' of the pipe.

"Wound with a long pitch" means that the absolute value of the spiral angle is less than 60°, and typically between 25° and 55°.

The armor elements 29 of a first layer 24 are generally wound by an opposite angle relative to the armor elements 29 of a second layer 25. Thus, if the winding angle of the armor elements 29 of the first layer 24 is equal to +α, α being between 25° and 55°, the winding angle of the armor elements 29 of the second armor layer 25 positioned in contact with the first armor layer 24 is for example equal to −α.

The armor elements 29 are for example formed by metal wires, in particular steel wires, or strips of composite material, for example reinforced carbon fiber strips.

As will be seen later, in reference to FIG. 2, the armor elements 29 each have an end segment 32 inserted into the fitting piece 14. The end segment 32 extends to a free end positioned in the fitting 14. It advantageously has a spiral or pseudo-spiral trajectory with axis A-A' in the fitting 14.

The outer sheath 30 is designed to prevent the permeation of fluid from the outside of the flexible pipe toward the inside. It is advantageously made from a polymer material, in particular with a base of a polyolefin, such as polyethylene or polypropylene, a base of a polyamide, such as PA11 or PA12, or a base of a fluorinated polymer such as polyvinylidene fluoride (PVDF) or perfluoroalkoxy (PFA).

The thickness of the outer sheath 30 is for example between 5 mm and 20 mm.

According to one embodiment variant of the flexible pipe of FIG. 1, the tensile armor layers are wound in a helix around its longitudinal axis, in opposite directions, according to a precise winding angle equal to 55°. The flexible pipe structure is then "balanced" and is thus not highly subject to the variations in length and to torsion effects in case of strong internal pressure. Such a structure does not comprise a pressure arch. Thus, the inner armor layer is no longer pressed on the pressure arch, but is pressed directly in contact with the pressure sheath.

Figure 2:
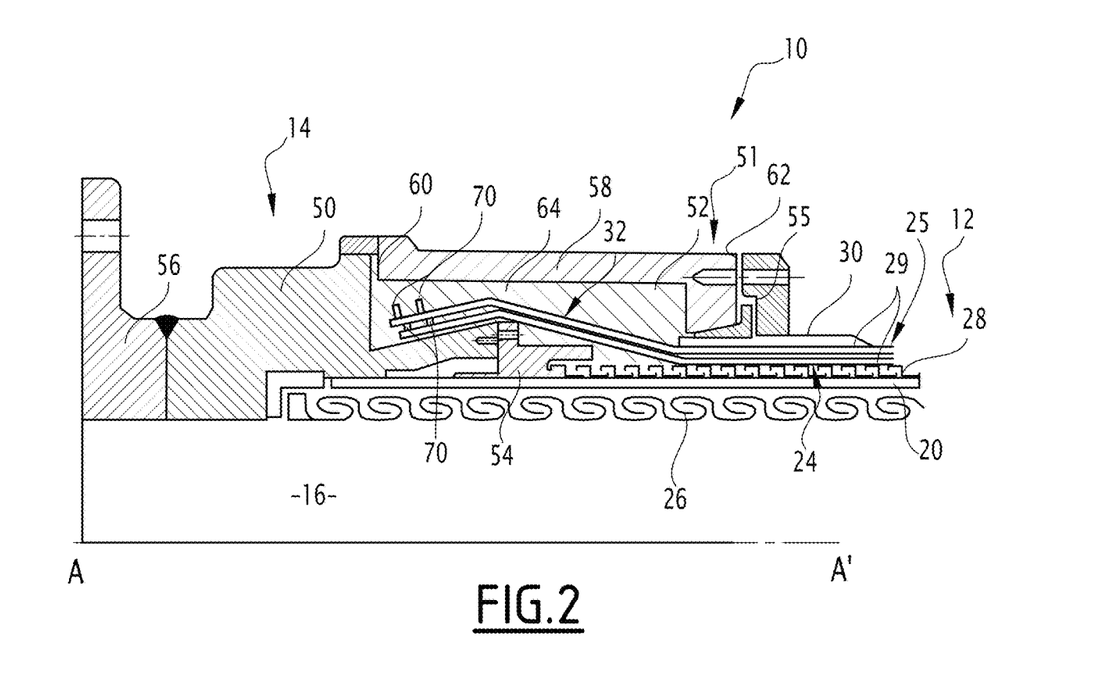
FIG. 2 is a sectional schematic view along a median axial plane of a fitting of the flexible pipe of FIG. 1.

As illustrated by FIG. 2, each fitting 14 includes an end arch 50 and an outer connecting cover 51 protruding axially rearwards from the arch 50. The cover 51 delimits, with the end arch 50, a space 52 for receiving the free ends 32 of the armor elements 29.

The fitting 14 further includes a front sealing assembly 54 around the pressure sheath 20, and a rear sealing assembly 55 around the outer sheath 30, shown schematically in FIG. 2.

In this example, the end arch 50 is intended to connect the pipe 10 to another connecting fitting 14 or to terminal equipment, advantageously by means of an end flange 56.

The arch 50 has a central bore intended to receive the end of the first sheath 20 and to allow the flow of the fluid circulating through the central passage 16 toward the outside of the pipe 10.

The cover 51 includes a tubular peripheral wall 58 extending around the axis A-A'. The peripheral wall 58 has a front edge 60 attached on the end arch 50, radially away from the armor layers 24, 25, and a rear edge 62 extending axially backward past the end arch 50, on which the rear assembly 55 is attached.

The cover 51 delimits the space 52 radially toward the outside. A rear face of the end arch 50 axially defines the space 52 in the forward direction.

The volume of the space 52 varies depending on the size of the fitting. For example, for a pipe with an inner diameter equal to 6", or about 15.2 cm, the volume of the space 52 is about 30 liters, and for a pipe with an inner diameter equal to 16", or about 40.6 cm, the volume of the space 52 is about 60 liters.

The front sealing assembly 54 is advantageously situated in front of the fitting 14, in contact with the arch 50, while being axially offset in the forward direction relative to the rear sealing assembly 55.

In a known manner, the front assembly 54 includes a front crimping ring, intended to engage on the pressure sheath 20.

In the example shown in FIGS. 1 and 2, in which the pipe 10 includes a pressure arch 28, the front assembly 54 further includes an intermediate stop ring for the pressure arch 28.

The rear sealing assembly 55 is positioned behind the front assembly 54. It includes at least one rear crimping ring crimping the outer sheath 30.

The front 54 and rear 55 assemblies are attached with conventional attachment means, such as screws, to the arch 50 and to the cover 51, respectively.

The fitting 14 further includes a solid filler material 64. The filler material 64 for example includes a thermosetting polymeric resin of the epoxy, polyimide (PI), polysulfone (PS), polyether either ketone (PEEK), or polyphenylene sulfide (PPS) type.

The filler material 64 is arranged in the space 52 around the arch 50 and embeds the end segments 32 of the armor elements 29. Advantageously, the filler material 64 completely fills the space 52.

Figure 3:
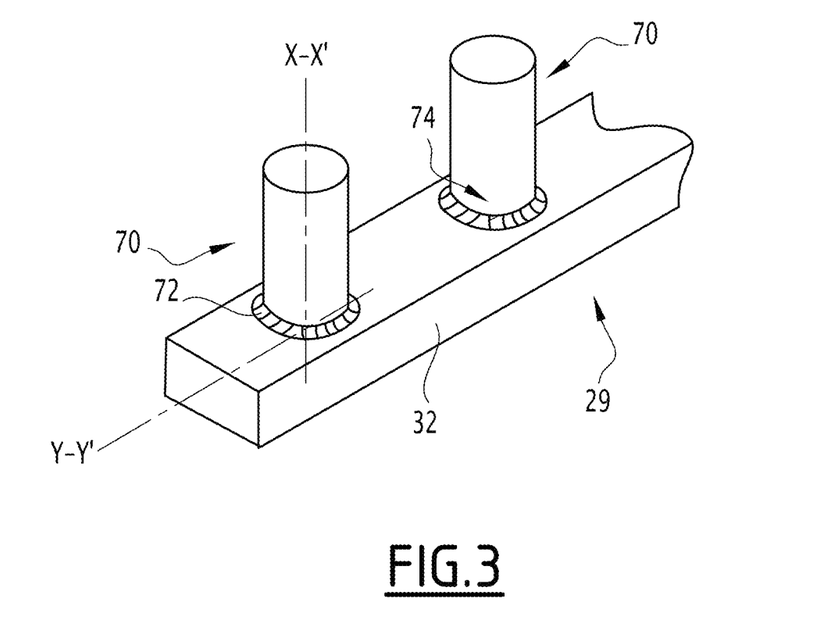
FIG. 3 is a perspective view of the end of an armor element inserted into the fitting of FIG. 2.

As shown in FIGS. 2 and 3, the end segments 32 of the armor elements 29 are each provided with at least one anchorage element 70, for example two anchorage elements 70 in the illustrated case. Each anchorage element 70 protrudes transversely from the end segment 32 of the armor element 29 toward the outside of the pipe 10.

In the case where the end segment 32 is provided with several anchorage elements 70, the anchorage elements 70 are substantially aligned along the armor element 29, and separated from one another by a distance, measured relative to the center of each anchorage element, of between 2 cm and 20 cm, preferably between 2 cm and 10 cm, and advantageously between 2 cm and 5 cm.

The anchorage element 70 is a metal part, for example cylindrical, having an axis X-X'. In a variant, the anchorage element 70 has a threaded cylinder shape with axis X-X', or an elongated parallelepiped shape along a direction X-X' transverse to the armor element 29.

Advantageously, the axis X-X' of the anchorage element 70 is substantially orthogonal to a local axis Y-Y' of the armor element 29 at the attachment of the anchorage element 70 on the armor element 29.

The anchorage element 70 has a length, measured in a direction transverse to the axis Y-Y' of the armor element 29, and a width, measured in a dimension parallel to the axis Y-Y' of the armor element 29.

According to the invention, a ratio between the length and the width of the anchorage element 70 is greater than 2, advantageously greater than 4.

The anchoring element 70 is for example made from steel, and has a tensile strength limit greater than or equal to 400 MPa, advantageously greater than 600 MPa, as measured according to standards NF EN ISO 6892-1 (November 2016 Edition), NF EN ISO 898-1 (May 2013 Edition) and NF EN ISO 3506-1 (January 2010 Edition).

Figure 4:
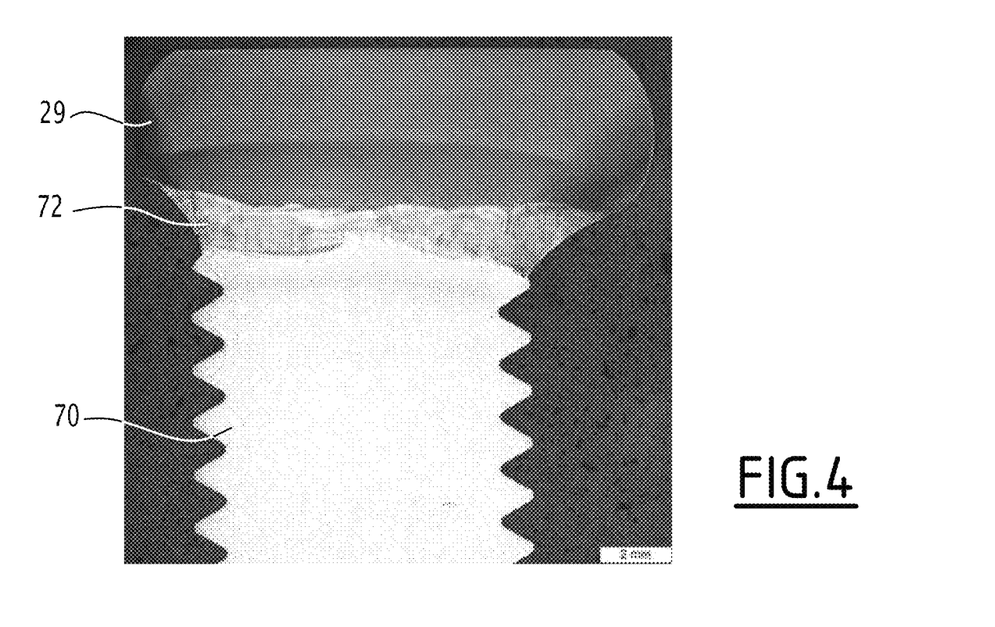
FIG. 4 is a sectional photograph showing a weld formed between an anchorage element and an armor element using the method according to the invention.

In reference to FIG. 4, the anchorage element 70 is attached to the armor element 29 by a weld 72 connecting a lower end 74 of the anchorage element 70 to the armor element 29.

The length of the anchorage element 70 is greater than a thickness of the armor element 29, measured along the axis X-X' of the anchorage element 70, advantageously two times greater.

The anchorage element(s) 70 are embedded in the filler material 64. A high ratio ensures better maintenance of the end segment 32 of the armor element 29 in the receiving space 52, owing to a better interaction with the filler material 64.

As illustrated in FIG. 4, the weld 72 has an expanse slightly greater than the width of the anchorage element 70, but smaller than a width of the armor element 29, measured in a direction orthogonal to the axis X-X' of the anchorage element 70 and the axis Y-Y' of the armor element 29.

The weld 72 has a high mechanical shear strength in a direction parallel to the axis Y-Y' of the armor element 29. Thus, each anchorage element 70 has a maximum shear strength along the axis Y-Y' of the armor element 29 greater than or equal to 15 kN, advantageously greater than 30 kN, as measured by standards NF EN ISO 6892-1 (November 2016 Edition), NF EN ISO 898-1 (May 2013 Edition) and NF EN ISO 3506-1 (January 2010 Edition).

The method for attaching the anchorage element 70 on the armor element 29 will now be described in reference to FIGS. 5 to 7.

Figure 5:
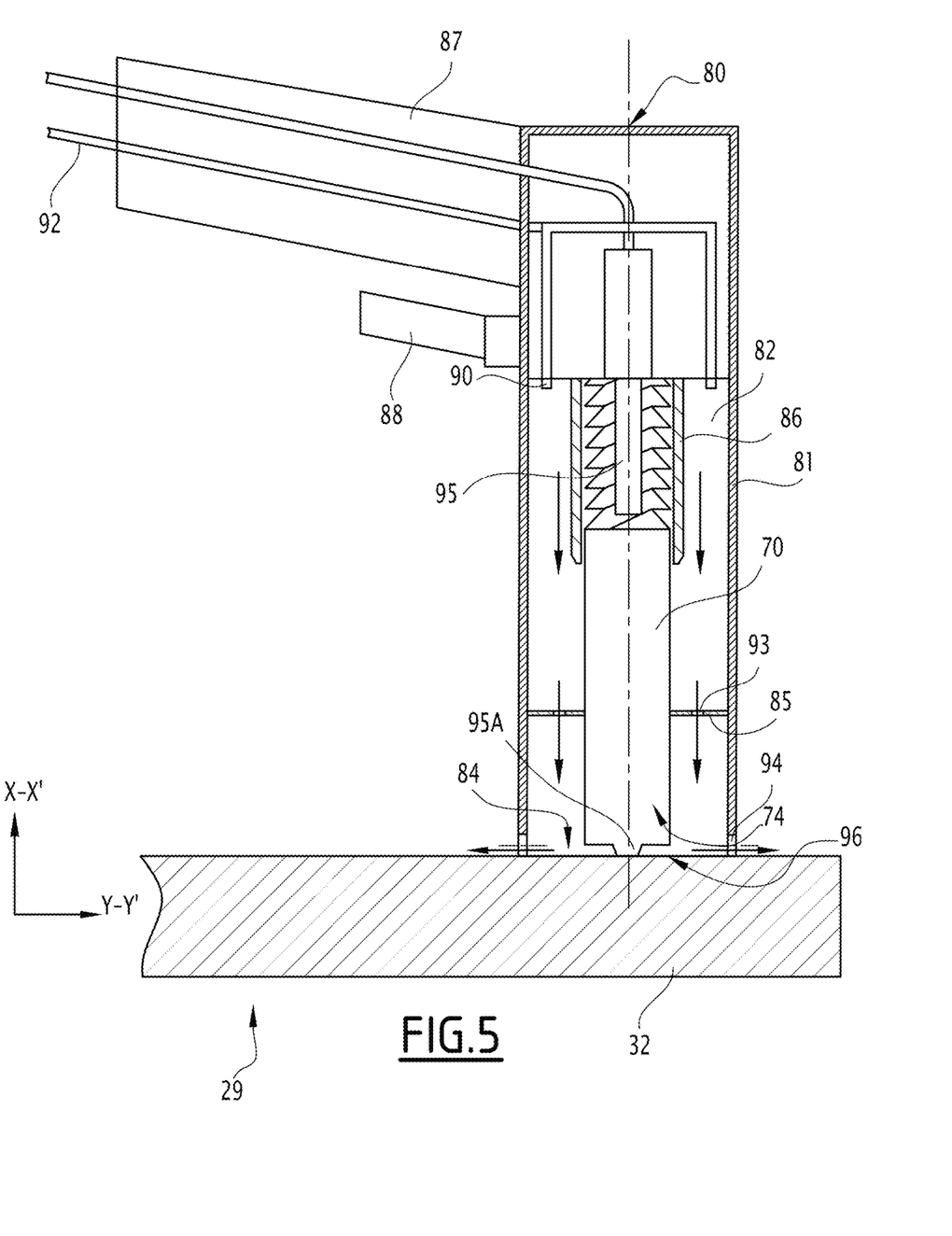
FIGS. 5, 6 and 7 are sectional side views of the steps of the method for attaching an anchorage element on the end of an armor element, as shown in FIG. 3.
Figure 6:
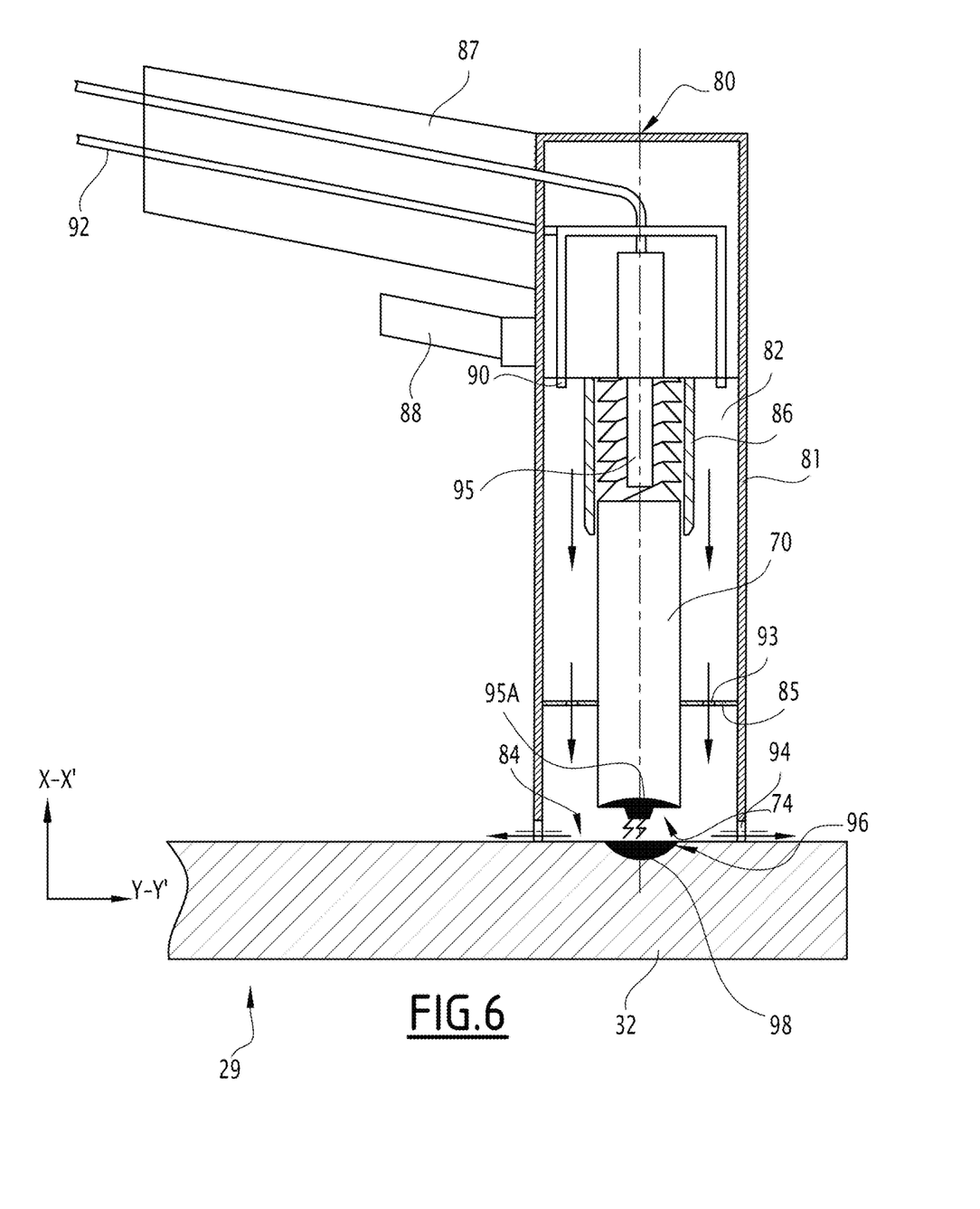
Figure 7:
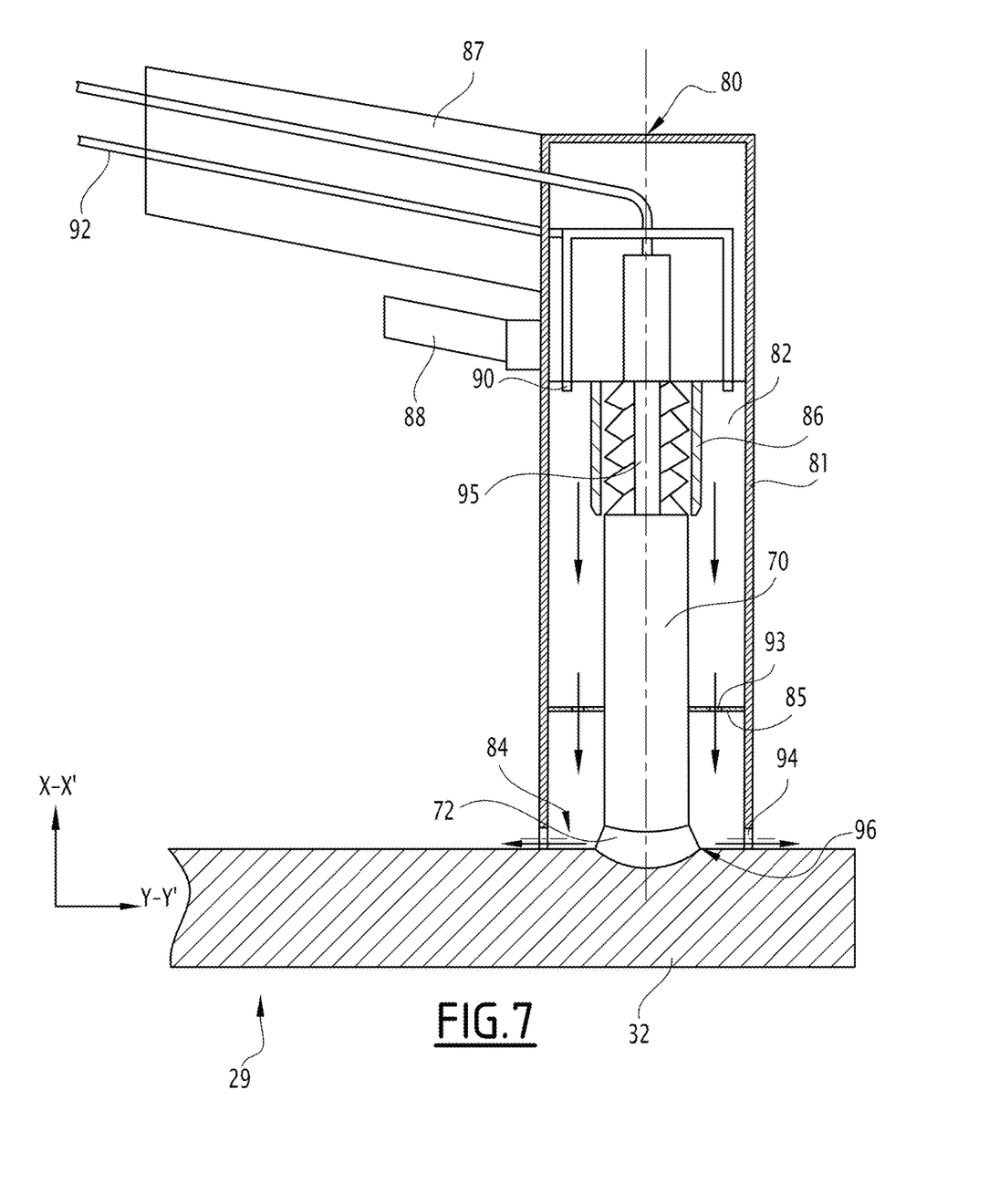

This method is implemented using an attachment device 80, shown schematically in FIGS. 5 to 7, suitable for attaching the anchorage element 70.

The device 80 is for example a welding gun, comprising control electronics suitable for implementing the attachment method of the "melting-forging" type.

The device 80 comprises a tube 81 defining a cavity 82 in which the anchorage element 70 is loaded. The cavity 82 assumes the form of an elongate cylinder, emerging at one end of the tube 81 through an opening 84.

The device 80 comprises, in the cavity 82, a guide 85 suitable for guiding the anchorage element 70 in the cavity 82, and a clamp 86 keeping the anchorage element 70 in the cavity 82.

The device 80 also comprises a handle 87, located on the opposite side of the tube 81 relative to the opening 84, suitable for the handling of the device 80, as well as a trigger 88 situated close to the handle 87, capable of triggering the attachment method of the anchorage element 70.

The device 80 comprises at least one neutral gas diffusing nozzle 90 emerging in the cavity 82, connected to a neutral gas supply hose 92. In order for the gas to be able to flow in the cavity 82, the guide 85 has perforations 93, and the tube 81 also has radial perforations 94 at the opening 84.

The device 80 further comprises a striker 95, capable of applying a forging force on the anchorage element 70, as well as an electric current generator (not shown), capable of generating at least one electric current through the anchorage element 70 and the armor element 29 when they are in contact with one another.

When the anchorage element 70 is at a distance from the armor element 29, the electric current generator is capable of forming an electric melting arc between the anchorage element 70 and the armor element 29.

The device 80 is handled by an operator, who holds it by the handle 87.

As shown in FIG. 5, an anchorage element 70 is supplied, placed in the cavity 82 of the device 80. The anchorage element 70 is arranged with the lower end 74 oriented toward the opening 84, and is held in the clamp 86 by its free end.

The anchorage element 70 is for example placed manually in the cavity 82 by the operator.

In a variant, the device 80 includes a loading system capable of placing the anchorage element 70, and replacing it at the end of the attachment method. This makes it possible to implement a series of anchorage element 70 attachments, with a duration separating each attachment of less than or equal to 5 seconds.

Preferably, the lower end 74 of the anchorage element 70 is flat. Advantageously, however, the lower end 74 has a protuberance 95A protruding toward the armor element 29. This facilitates the welding of the anchorage element 70 on the armor element 29.

During a first step for placement of the device 80, the tube 81 is placed in contact with an end segment 32 of an armor element 29. The opening 84 of the cavity 82 extends facing the armor element 29 and defines, on the armor element 29, an attachment region 96 of the anchorage element 70.

The anchorage element 70 is initially positioned in contact with the armor element 29.

Preferably, the device 80 is oriented such that the axis of the tube 81 is substantially orthogonal to the local axis of the armor element 29.

During a diffusion step, the operator activates the trigger 88, and neutral gas is diffused by the nozzles 90. The neutral gas flows into the cavity 82, through the perforations 93, up to the opening 84. The neutral gas flows in particular around the anchorage element 70 and the attachment region 96, then along the radial perforations 94 to the outside.

After a diffusion duration from about 0.5 seconds to 2 seconds, the neutral gas has at least partially driven out the air around the anchorage element 70 and the attachment region 96.

The diffusion of neutral gas by the nozzles 90 is maintained during the following steps, and reduces the porosity in the weld 72, which improves its mechanical strength.

A melting step, illustrated by FIG. 6, is triggered once the diffusion duration has elapsed. The duration of the diffusion step is advantageously programmed in the control electronics of the device 80, and the latter automatically triggers the following step once the duration has elapsed. This duration is for example less than 1 second.

During the melting step, an electric current is generated by the electric current generator through the anchorage element 70 and the armor element 29.

The anchorage element 70 is next gradually moved away from the armor element 29, which leads to the generation of an electric melting arc in the volume of gas present between the anchorage element 70 and the armor element 29 by the electric current generator. The electric melting arc forms in the cavity 82, in the neutral gas stream.

Advantageously, the electric melting arc initially forms between the flat face of the lower end 74 of the anchorage element 70 or, when it is present, between the protuberance 95A and the armor element 29, owing to the reduced distance that separates them.

Under the effect of the heat given off by the electric melting arc, the lower end 74 of the anchorage element 70 and part of the attachment region 96 partially melt, forming a molten pool 98 on the armor element 29. The molten pool 98 contains molten metal and has a width measured transversely to the axis X-X' greater than the width of the anchorage element 70 measured transversely to the axis X-X'.

A forging step, shown in FIG. 7, is then triggered by the control electronics of the device 80, during which the striker 95 exerts a force on the anchorage element 70 along the axis X-X' to forge the lower end 74 against the armor element 29. The lower end 74 is submerged in the molten pool 98, fusing the lower end 74 of the anchorage element 70 and the attachment region 96.

The method lastly comprises a heat treatment step during which the temperature in the cavity 82 decreases, which causes a solidification of the molten metal and the formation of the weld 72.

Advantageously, the decrease in the temperature in the cavity 82 is controlled in order to ensure a good mechanical strength of the weld 72.

Preferably, a preheating heat treatment of the anchorage element 70 is done before the diffusion step in order to avoid cold cracking problems at the weld. Furthermore, a post-heating heat treatment of the anchorage element 70 is also done after allowing it to cool in order to solidify the weld. This post-heating heat treatment consists of an annealing step of the anchorage element 70. The anchorage element 70 is thus heated so as to increase its temperature to homogenize its microstructure and eliminate the residual stresses that may remain after the implementation of the welding method.

The described method for attaching at least one anchorage element 70 is particularly advantageous, since it requires a much shorter implementation time than that of the existing methods. Furthermore, it is done with a simpler and partially automated device 80, therefore requiring less significant technical skills from the operator.

According to a first variant that is not shown, the method for attaching the anchorage element 70 follows a shorter process time not comprising diffusion of a neutral gas.

In this case, the anchorage element 70 has a collar extending transversely to the axis X-X' around the lower end 74, in order to increase the transverse expanse of the weld 72. This partially offsets the lower mechanical strength of the weld 72 due to the formation of a porosity caused by the absence of the neutral gas around the molten pool 98 during the melting step.

The melting step comprises a preliminary step for forming a priming arc before the formation of the electric melting arc.

The priming arc has an intensity lower than an intensity of the electric melting arc and primes the melting of the material of the lower end 74 and the attachment region 96, which makes it possible to accelerate the process.

According to a second variant that is not shown, the diffusion of neutral gas is replaced by the placement of a ring made from a refractory material around the anchorage element 70. The ring widens, protruding around the lower end 74.

The ring bears on the armor element 29 during the step for placement of the device 80, defining a closed space for protection of the molten pool 98 during the melting step. The ring contains and isolates the molten pool 98 from the surrounding air, reducing porosity formation in the weld 72.

The ring is partially burned during the melting step and is easily removed from the anchorage element 70 once the heat treatment step is completed.

The method for assembling the fitting 14 according to the invention is done as follows.

Initially, the different layers of the pipe 10 are cut to the correct length to expose, on the pressure arch 28, a free end segment 32 of each armor element 29 of the armor layers 24, 25. This being done, the end segments 32 of the armor elements 29 of the armor layers 24, 25 are folded rearwards. The end arch 50 and the front sealing assembly 54 are next put into place. Then, each end segment 32 of the inner armor layer 24 is unfolded in the forward direction.

At least one anchorage element 70 is attached on each end segment 32, according to the attachment method described above. Advantageously, at least two anchorage elements 70 are attached on each end segment 32.

The end segments 32 are spaced apart from one another by a distance on the order of several millimeters.

Next, at least one anchorage element 70 is attached on each end segment 32 of the elements 29 of the outer armor layer 25 according to the same attachment method as that used for the inner armor layer 24.

Then, each end segment 32 of the outer armor layer 25 is unfolded in the forward direction.

Alternatively, the attachment of the at least one anchorage element 70 on the end segments 32 of the armor elements 29 of the armor layers 24, 25 can be done before they are unfolded in the forward direction.

The cover 51 is next placed and attached to the arch 50, thus forming the receiving space 52 around the end segments 32.

The rear sealing assembly 55 is next placed and attached to the cover 51.

According to a first variant, the end segments 32 of the armor elements 29 of the outer armor layer 25 are folded in the rear direction in order to allow access to the elements 29 of the inner armor layer 24. At least one anchorage element 70 is attached on each end segment 32 of the inner armor layer 24, according to the attachment method described above. Advantageously, at least two anchorage elements 70 are attached on each end segment 32.

Next, at least one anchorage element 70 is attached on each end segment 32 of the elements 29 of the outer armor layer 25 according to the same attachment method as that used for the inner armor layer 24. Then, each end segment 32 of the outer armor layer 25 is unfolded in the forward direction.

Alternatively, the attachment of the at least one anchorage element 70 on the end segments 32 of the armor elements 29 of the outer armor layer 25 is done after they are unfolded in the forward direction.

Preferably, according to a second embodiment variant of the fitting method of the fitting 14 according to the invention, the end segments 32 of the armor layers 24, 25 are arranged during the manufacture of the end fitting 10 to have their configuration as close as possible to their natural configuration, in which they are the least stressed.

This configuration is obtained by allowing the end segments 32 of each layer 24, 25 to relax freely, which allows them to adopt a divergent configuration, with a bell shape. The end segments 32 thus configured do not need to be folded rearwards, since they are unfolded forwards to allow the placement of the end arch 50 and the front sealing assembly 54.

Thus, once the access to the free end segments 32 of each armor element 29 of the armor layers 24, 25 is authorized after the cutting of the outer layers, at least one end 70 is attached on each end segment 32 of the armor layers 24, 25 using the same attachment method as that described hereinabove. Advantageously, at least two anchorage elements 70 are attached on each end segment 32.

The cover 51 is next placed and attached to the arch 50, thus forming the receiving space 52 around the end segments 32.

The rear sealing assembly 55 is next placed and attached to the cover 51.

Advantageously, according to a third variant (not shown), the outer sheath 30 is machined to show the outer armor layer 25. A rear cannula, element belonging to the rear sealing assembly 55, is then inserted between the armor layer 25 and the outer sheath 30. One then arranges a first attachment collar of the "band-it" type around the outer armor layer 25, near the rear cannula, leaving a sufficient length between the first attachment collar and the rear cannula to allow the attachment of at least one anchorage element 70.

At least one anchorage element 70 is then attached on each end segment 32 of the elements 29 of the outer armor layer 25, between the first attachment collar and the rear cannula, according to the same attachment method as that described hereinabove. Advantageously, at least two anchorage elements 70 are attached on each end segment 32 of the armor elements 29. Lastly, one cuts all of the excess lengths of the end segments 32 of each armor element 29 forming the outer armor layer 25, located in front of the attachment collar.

Eliminating the excess lengths of the armor elements 29 of the layer 25 makes it possible to access the inner armor layer 24. By proceeding in the same way as before, one arranges a second attachment collar around the inner armor layer 24 while leaving a sufficient length between the second attachment collar of the outer armor layer 25, to allow the attachment of at least one anchorage element 70.

At least one anchorage element is then attached on each end segment 32 of the elements 29 of the inner armor layer 24, between the second attachment collar and the armor layer 25, according to the same attachment method as before. Advantageously, at least two anchorage elements 70 are attached on each end segment 32 of the armor layer 24.

The cover 51 is next placed and attached to the arch 50, thus forming the receiving space 52 around the end segments 32.

The rest of the elements forming the rear sealing assembly 55 are next placed and attached to the cover 51.

This last method for fitting an end-fitting has the advantage of shortening the necessary total length of the end-fitting as well as reducing the total cost of a flexible pipe including such an end-fitting. Indeed, the length of the end segments 32 being reduced, it is no longer necessary to provide for supplying an end arch 50 having an area with a frustoconical section.

The filler material 64 is then inserted into the space 52, advantageously in fluid form.

The material 64 fills the space 52 and solidifies between the arch 50 and the cover 51 around end segments 32 of the armor elements 29 and around anchorage elements 70. The material 64 solidifies at ambient temperature, corresponding to the temperature inside the end-fitting, and under atmospheric pressure. In cases where the outside temperature is below 15° C., heating means are used to control the solidification of the material 64, for example a heated blanket.

The solidification time is on the order of several hours, more particularly from 3 hours to 6 hours.

The end segments 32 are then embedded in the filler material 64.

During operation, when the end-fitting 14 is connected to another end-fitting or to a surface assembly, the axial tension transmitted by the armor layers 24, 25 resulting from the weight of the pipe 10 is reacted by the segments 32 embedded in the filler material 82, and more particularly by the anchorage elements 70.

The invention claimed is:

1. A method for attaching at least one transverse anchorage element on an armor element intended to be received in an end-fitting of a flexible pipe, wherein the method comprises the following steps:
   supply of an attachment device having a cavity accepting an anchorage element;
   bringing of an opening of the cavity to face the armor element;

melting of one end of the anchorage element facing the armor element and of a region of the armor element facing the anchorage element, inside the cavity of the attachment device;

forging of the anchorage element transversely on the armor element, using the attachment device; and formation of a weld connecting the anchorage element and the armor element.

2. The method according to claim 1, comprising a step for heat treatment of the anchorage element and the armor element after the forging step, the weld connecting the anchorage element and the armor element forming during the heat treatment step.

3. The method according to claim 1, wherein the weld has a transverse expanse smaller than a width of the armor element.

4. The method according to claim 1, wherein the melting step comprises forming a melting electric arc between the anchorage element and the armor element.

5. The method according to claim 4, wherein the melting step comprises forming a priming arc before the formation of the melting electric arc, the priming arc having a lower intensity than an intensity of the melting electric arc.

6. The method according to claim 1, comprising a step of diffusing a neutral gas around at least one of the end of the anchorage element or the region of the armor element, the diffusing step taking place during the melting and forging steps.

7. The method according to claim 1, wherein a refractory ring is positioned around the end of the anchorage element facing the armor element during the bringing step.

8. The method according to claim 1, wherein a ratio between a length of the anchorage element, measured along a direction transverse to the armor element, and a width of the anchorage element, measured along a direction parallel to the armor element, is greater than 2.

9. The method according to claim 8, wherein the length of the anchorage element is greater than a thickness of the armor element, measured along the same direction as the length of the anchorage element.

10. The method according to claim 9, wherein the length of the anchorage element is twice greater than the thickness of the armor element.

11. The method according to claim 8, wherein the ratio is greater than 4.

12. The method according to claim 1, wherein the anchorage element is substantially cylindrical and has an axis substantially perpendicular to a local axis of the armor element.

13. The method according to claim 1, comprising a series of attachments of transverse anchorage elements, each attachment comprising the supply, bringing, melting and forging steps, a duration separating each attachment being less than or equal to 1 minute.

14. The method according to claim 13, wherein the anchorage elements are attached separated from one another by a distance along the armor element comprised between 2 cm and 20 cm.

15. The method according to claim 13, wherein the duration separating each attachment is less than 30 seconds.

16. The method according to claim 1, wherein the anchorage element is made of a steel having a mechanical tensile strength greater than or equal to 400 MPa.

17. A method for mounting an end-fitting for a flexible pipe comprising the following steps:

supplying a flexible pipe comprising:

at least one tubular sheath delimiting a circulation passage; and at least one tensile armor element positioned outwardly relative to the tubular sheath, the armor layer comprising a plurality of filiform armor elements;

clearing an end segment of each armor element;

placing an end arch at one end of the pipe;

attaching at least one anchorage element on each armor element using a method according to claim 1;

placing and attaching a cover on the end arch, forming a space for receiving the end segment of the armor elements;

inserting a filler material into the space, embedding the at least one anchorage element; and solidifying the filler material around the end segment and the at least one anchorage element.

* * * * *